(12) United States Patent
Rosenbaum et al.

(10) Patent No.: US 11,511,366 B2
(45) Date of Patent: Nov. 29, 2022

(54) WELDING APPARATUS

(71) Applicant: HILTI AKTIENGESELLSCHAFT, Schaan (LI)

(72) Inventors: Ulrich Rosenbaum, Wangs (CH); Markus Woerner, Hergensweiler (DE); Uwe Popp, Widnau (CH)

(73) Assignee: Hilti Aktiengesellschaft, Schaan (LI)

( * ) Notice: Subject to any disclaimer, the term of this patent is extended or adjusted under 35 U.S.C. 154(b) by 296 days.

(21) Appl. No.: 16/652,726

(22) PCT Filed: Oct. 4, 2018

(86) PCT No.: PCT/EP2018/076988
§ 371 (c)(1),
(2) Date: Apr. 1, 2020

(87) PCT Pub. No.: WO2019/072675
PCT Pub. Date: Apr. 18, 2019

(65) Prior Publication Data
US 2020/0238426 A1    Jul. 30, 2020

(30) Foreign Application Priority Data

Oct. 10, 2017   (EP) .................................... 17195643

(51) Int. Cl.
*B23K 9/20*          (2006.01)
*B23K 9/16*          (2006.01)
*B23K 11/00*         (2006.01)

(52) U.S. Cl.
CPC ................ *B23K 9/202* (2013.01); *B23K 9/16* (2013.01); *B23K 11/0053* (2013.01)

(58) Field of Classification Search
CPC . B23K 9/20; B23K 9/16; B23K 9/202; B23K 11/0053; B23K 5/22
See application file for complete search history.

(56) References Cited

U.S. PATENT DOCUMENTS

| | | | |
|---|---|---|---|
| 3,790,740 A | | 2/1974 | Shoup |
| 3,989,920 A | * | 11/1976 | Masubuchi .......... B23K 9/0061 219/98 |
| 4,315,732 A | * | 2/1982 | Rowbottam ............ F23D 14/28 431/255 |
| 6,977,358 B2 | * | 12/2005 | Albrecht ................ B23K 9/173 219/74 |
| 2008/0223830 A1 | | 9/2008 | Gibbons et al. |

FOREIGN PATENT DOCUMENTS

| | | |
|---|---|---|
| CN | 202726248 U | 2/2013 |
| JP | 2004314140 A | 11/2004 |

OTHER PUBLICATIONS

International Bureau, International Search Report in International Application No. PCT/EP2018/076988, dated Nov. 20, 2018.

* cited by examiner

*Primary Examiner* — Dana Ross
*Assistant Examiner* — Joe E Mills, Jr.
(74) *Attorney, Agent, or Firm* — Leydig Voit & Mayer, Ltd.

(57) ABSTRACT

Disclosed is an apparatus for welding a weld stud to a substrate, comprising a welding gun which includes a casing and a stud holder for the weld stud, further comprising a gas container and a gas line for conducting gas from the gas container to the stud holder, the gas container being supported by the welding gun.

18 Claims, 2 Drawing Sheets

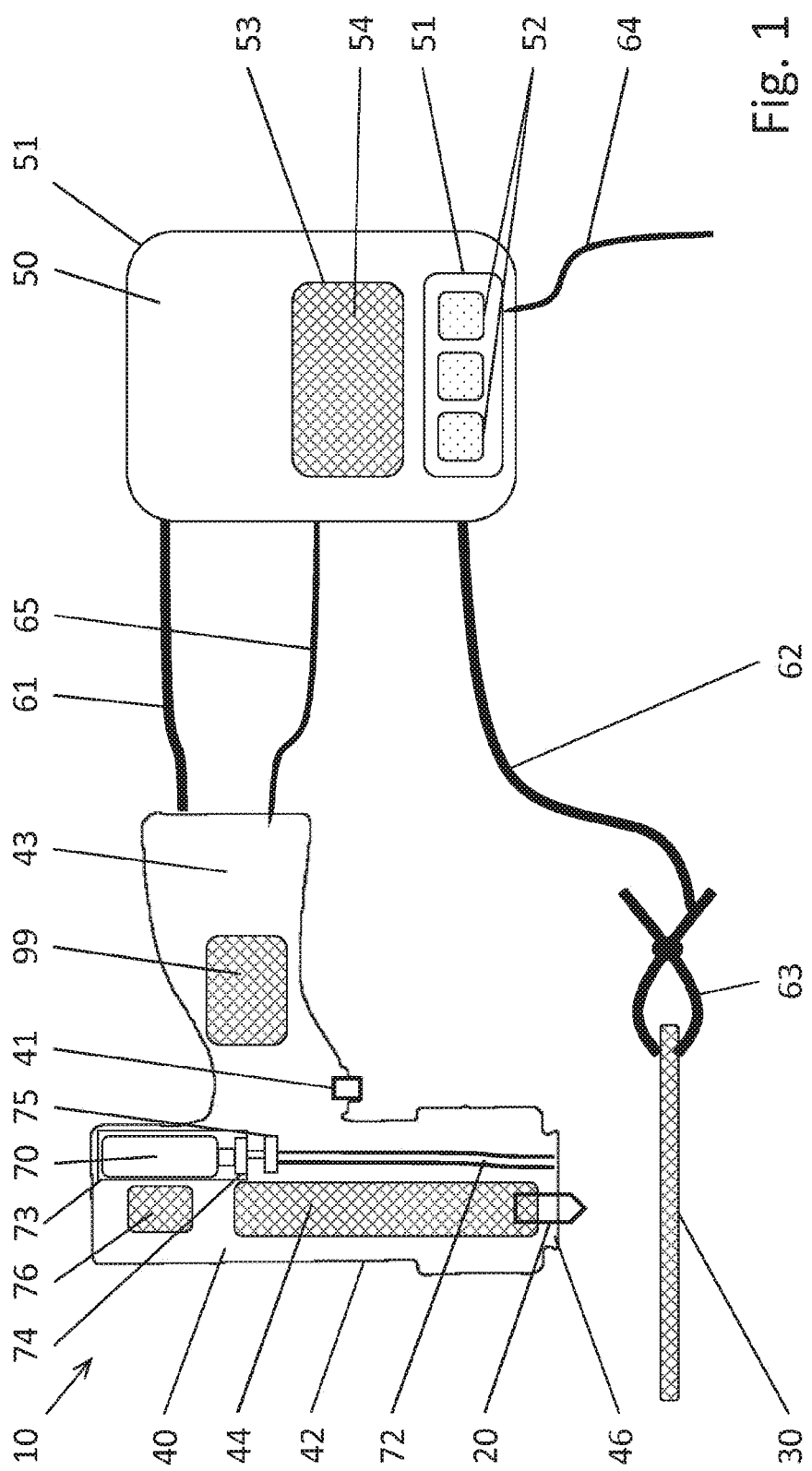

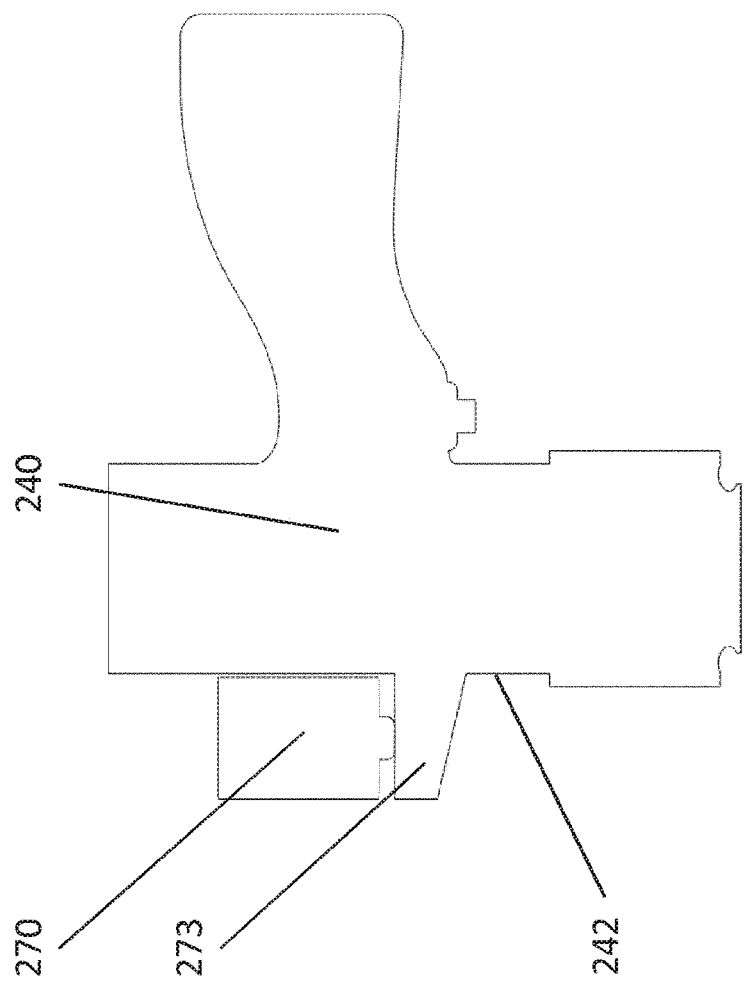

WELDING APPARATUS

CROSS-REFERENCE TO RELATED APPLICATIONS

This patent application is the U.S. National Stage of International Patent Application No. PCT/EP2018/076988, filed Oct. 4, 2018, which claims the benefit of European Patent Application No. 17195643.6, filed Oct. 10, 2017, which are each incorporated by reference.

TECHNICAL FIELD

The invention relates generally to an apparatus and a method for fastening a stud to a substrate, and also to such a stud.

BACKGROUND OF THE INVENTION

Quite a few apparatuses and methods are known with which various studs are fastened to a substrate in different applications. For example, a stud is brought into contact with the substrate and acted upon by electric current. As soon as the electric current flows between the stud and the substrate, the stud is lifted off from the underside, forming an arc. Due to the energy which is released, the material of the stud and of the substrate liquefies in part. Then the electric current is switched off and the stud is dipped into the liquefied material, while this material cools and becomes solid. The stud is then joined to the substrate in an integrally bonded manner.

In order to make available the necessary energy for liquefying the material of the stud and of the substrate in a sufficiently short time, apparatuses are known which generate an electric current with a very high current intensity and supply it to the stud by way of a correspondingly dimensioned electric cable. In order to avoid oxidation of the liquefied material, it is known to flush the contact point between the stud and the substrate with an inert gas. The inert gas to this end is provided in gas cylinders which together with the other components of the fastening apparatus have to be transported, and secured against falling over during the fastening operation.

In the case of applications for example in the construction industry or shipbuilding, studs are used in various sizes with a thread to which an object is screwed, in order to fasten the object to the substrate. Some parameters of the fastening method such as for example the duration and the electric power of the electric current have to be set on the apparatus, and adapted to the stud used, by a user. Finally, by means of visual inspection, the user assesses the quality of the join between the stud and the substrate. The join quality thus also depends on the experience and the capabilities of the user.

BRIEF SUMMARY OF THE INVENTION

The object of the invention is to make available an apparatus and/or a method with which the fastening of a stud to a substrate is simplified and/or improved.

This object is achieved in the case of an apparatus for welding a weld stud to a substrate, with a welding gun which comprises a casing and a stud holder for the weld stud, with a gas container, and with a gas line for conducting gas from the gas container to the stud holder, in that the gas container is supported by the welding gun.

One advantageous embodiment is characterized in that the gas line is supported by the welding gun. Preferably the gas line is arranged at least in part in the casing. More preferably, the gas line is arranged entirely in the casing.

One advantageous embodiment is characterized in that the welding gun has a gas container receptacle for receiving the gas container. Preferably the gas line has a gas connection element arranged on the gas container receptacle.

One advantageous embodiment is characterized in that the apparatus has a gas throughflow regulation device for regulating a gas throughflow through the gas line. Preferably the gas throughflow regulation device is arranged at least in part in the casing. More preferably, the gas throughflow regulation device is arranged entirely in the casing.

One advantageous embodiment is characterized in that the apparatus has a welding unit, a first electric cable for conducting welding current from the welding unit to the welding gun, and a second electric cable for conducting the welding current from the substrate to the welding unit.

One advantageous embodiment is characterized in that the apparatus has a filling level detection device for the gas container, which device is supported by the welding gun. Preferably the filling level detection device comprises a pressure sensor for measuring the internal pressure of the gas container. Likewise preferably, the filling level detection device comprises a data processing device which detects the number of welds which have been made. Likewise preferably, the filling level detection device comprises a storage medium which is attached to the gas container, and a data processing device, which is supported by the gas gun and is suitable for storing information relating to a filling level of the gas container on the storage medium or reading it out from the memory. Likewise preferably, the filling level detection device comprises a display unit which displays a filling level of the gas container which is detected by the filling level detection device.

BRIEF DESCRIPTION OF THE SEVERAL VIEWS OF THE DRAWING(S)

The invention will be discussed in greater detail below using embodiments with reference to the drawings.

FIG. 1 schematically shows a welding apparatus, and

FIG. 2 schematically shows a welding gun.

DETAILED DESCRIPTION OF THE INVENTION

FIG. 1 schematically illustrates a welding apparatus 10 for welding a weld stud 20 to a substrate 30. A material of the weld stud 20 and a material of the substrate 30 are electrically conductive, in particular metallic. The welding apparatus 10 comprises a welding gun 40 with a trip switch 41 formed as a pushbutton switch, a welding unit 50 with a casing 51, a first electric cable 61, a second electric cable 62 with a connecting clamp 63, an electric supply cable 64 formed for example as a power cable, an electric communication line 65, a gas container 70 formed as a gas canister or gas cylinder, and a gas line 72 formed as a flexible gas tube or gas pipe.

The first cable 61 serves to supply the weld stud 20 with electric current through the welding unit 50. The second cable 62 serves to electrically connect the substrate 30 to the welding unit 50 if the connecting clamp 63 is clamped to the substrate 30. When the weld stud 20 contacts the substrate 30, a circuit is closed, so that the weld stud 20 can be acted upon by welding current, which is in the form for example of direct current or alternating current, by the welding unit 50. The welding gun 40 to this end comprises a welding current contact element, not shown in FIG. 1. The welding unit 50 comprises an apparatus, not shown, for converting electric current from the supply cable 64 into welding current, which apparatus for example comprises an electrical capacitor, a thyristor, a bipolar transistor with isolated gate electrode, or other power electronics components, and also an associated controller with a microprocessor, in order to provide the welding current with desired voltage and current intensity.

The welding unit 50 has an input device 51 with actuating elements 52, and also an output device 53 with a visual display element 54 and a wireless transmission element. The input device 51 serves to input parameters of a welding process which is to be carried out with the welding apparatus 10, such as for example the electrical voltage, current intensity, power and duration of the welding current, position and speed of the stud, and so on, by a user of the welding apparatus 10. The output device 53 serves to issue information, such as for example information about parameters of the welding process, information about recorded emissions of the welding process, or other variables, information about a quality of the welding operation, information about measures to improve the welding operation, information about recorded properties of the weld stud, or information derived from the aforementioned variables, and/or recommendations or instructions for cleaning and/or maintaining the welding apparatus 10, in particular the welding gun 40, to the user.

The communication line 65 serves for communication between the welding gun 40, in particular a control device 99 of the welding gun 40, and the welding unit 50, in particular the controller and/or the input device 51 and/or the output device 53. This communication brings about for example an exchange of information about the parameters of a welding operation, in order for example to achieve or facilitate synchronization of the welding current with a movement of the weld stud 20. In embodiments, not shown, the communication between the welding gun and the welding unit takes place wirelessly, by radio or by means of the first electric cable, which conducts the welding current.

The welding gun 40 has a casing 42 with a mouth 46, from which casing a grip 43 with the trip switch 41 protrudes. The welding gun 40 further has a stud holder 44, on which the weld stud 20 is held during a welding operation. For this purpose, the stud holder comprises for example two, three, four or more resilient arms, not shown in detail, between which the weld stud 20 is inserted and held by means of a clamping fit. The welding gun 40 further has a welding current contact element for acting upon the weld stud 20 with a welding current, which element is integrated in the stud holder 44, for example in the form of one or more of the resilient arms.

The welding gun 40 further has the control device 99 for controlling the various components and devices of the welding gun and the welding unit 50. The control device 99 is provided for controlling one or more parameters of the welding operation. The control device 99 to this end comprises various electronic components, such as for example one or more microprocessors, one or more temporary or permanent data stores, and the like.

The welding gun 40 further has a stud lift device formed as a first lifting magnet, which subjects the stud holder 44 to a force away rearwards from the mouth 46 (upwards in FIG. 1) if the stud lift device is activated. By way of a signal line, not shown, the control device 99 communicates with the stud lift device in order to control, in particular to activate and deactivate, the stud lift device.

The welding gun 40 further has a stud plunge device formed as a spring element or as a second lifting magnet which subjects the stud holder 44 to a force towards the mouth 46 and forwards (downwards in FIG. 1) if the stud plunge device is activated. By way of a signal line, not shown, the control device 99 communicates with the stud plunge device in order to control, in particular to activate and deactivate, the stud plunge device. If the stud plunge device is formed as a spring element, this spring element is preferably tensioned if the stud holder is moved rearwards by the stud lift device, so that the spring element moves the stud holder forwards as soon as the stud lift device is deactivated.

The gas line 72 serves to supply a contact region between the weld stud 20 and the substrate 30 with a protective gas from the gas container 70, in order during a welding operation to protect the contact region from oxidation due to oxygen from a surrounding area. The gas line 72 conducts the protective gas to the stud holder 44, preferably in the region of the mouth 46.

The welding gun 40 has a gas container receptacle 73 arranged in the casing 42, in which the gas container 70 is interchangeably received, so that the gas container 70 is supported by the welding gun 40. The gas line 72 is arranged entirely in the casing 42 and supported by the welding gun 40. The gas line 72 has a gas connection element 74 which for connection of the gas container 70 to the gas line 72 is arranged on the gas container receptacle 73. Furthermore, the welding apparatus 10 and in particular the welding gun 40 has a gas throughflow regulation device 75 formed as a valve, in particular a solenoid valve, for regulating a gas throughflow through the gas line 72, the gas throughflow being regulated for example in that a cross-sectional area of the gas throughflow regulation device 75 is set, or in that a duration or frequency of one or more opened phases of the gas throughflow regulation device 75 is set. The regulation of the gas throughflow in this case is preferably matched to the other parameters of the welding operation and/or the gas volume in the gas line 72.

The gas throughflow regulation device 75 is arranged entirely in the casing 42 and supported by the welding gun 40 and serves to control a gas flow to the contact region between the weld stud 20 and the substrate 30. The gas throughflow regulation device 75 comprises a regulable valve, which is regulated for example by the control device 99. Inter alia, the control device 99 is provided to open the valve during a predetermined period in order to flush the gas line 72 with gas from the gas container, and to initiate a welding operation or to signal to a user of the welding apparatus 10 that the welding apparatus 10 is ready for a welding operation if the predetermined period has elapsed. Owing to the automated flushing of the gas line 72, under certain circumstances the waiting time prior to a welding operation and/or the gas consumption is reduced.

Furthermore, the welding apparatus 10 and in particular the welding gun 40 has a filling level detection device 76 for the gas container 70. The filling level detection device 76 is preferably arranged entirely in the casing 42 and supported by the welding gun 40. The filling level detection device 76 comprises a pressure sensor arranged in the gas line 72, for example on the gas connection element 74, for measuring the internal pressure of the gas container, and also a data processing device which detects the number of welds which have been made. In embodiments, not shown, the filling level detection device comprises a sensor in particular for measuring the weight or the inertia of the gas container, the drop in pressure or temperature during regulation of the gas flow, an acoustic response of the gas container contents, or the like. Additionally or alternatively, the filling level detection device 76 comprises a storage medium which is attached to the gas container 70, and a data processing device which is supported by the welding unit and is suitable for storing information about a filling level of the gas container 70 on the storage medium and/or reading it out from the memory and/or outputting it by means of the output device 53, for example the display element 54 thereof. The information about the filling level of the gas container 70 also comprises for example an indication or a prompt to refill the gas container 70 or to replace it with a full gas container. The gas container 70 is for example formed as a disposable container with a maximum gas pressure of 180 bar. One fill is sufficient for example for 50 to 100 welding operations.

FIG. 2 shows a welding gun 240 which has a casing 242 and a gas container 270 which is attached, in particular fastened, externally to the casing 242. The welding gun for this purpose comprises a gas container receptacle 273 which protrudes outwards from the casing 242. The gas line, not shown further in FIG. 2, is likewise attached, in particular fastened, externally to the casing 242 or arranged in the casing 242, and supported by the welding gun 240. Otherwise, the welding gun 240 is formed substantially like the welding gun 40 (FIG. 1).

In a welding process with the welding apparatus 10, first of all the substrate 30 and the stud 20 are made available. In a further step, information, for example about desired parameters of the following welding operation, is input by a user by way of the input device. In a further step, the weld stud 20 is acted upon by a welding current between the weld stud 20 and the substrate 30, by the welding unit 50 by means of the first cable 61 and the second cable 62. In a further step, the weld stud 20 by means of the stud lift device is lifted off from the substrate while maintaining the welding current flowing between the weld stud 20 and the substrate 30, with an arc forming between the weld stud 20 and the substrate 30. In particular due to the heat generated by the arc, then a material of the weld stud 20 and/or of the substrate 30 is liquefied in part. In a further step, the weld stud 20 is plunged by means of the stud plunge device into the liquefied material of the weld stud 20 or of the substrate 30. Thereafter, the liquefied material of the weld stud 20 or of the substrate 30 solidifies, so that the weld stud 20 is joined to the substrate 30 in an integrally bonded manner.

In order to flush the gas line 72 with gas from the gas container 70, the valve of the gas throughflow regulation device 75 is opened for a predetermined period, and the weld stud 20 is welded to the substrate 30, while gas from the gas container 70 flows around the weld stud 20. The welding of the weld stud 20 to the substrate 30 in this case is initiated if the predetermined period has elapsed. Alternatively, it is signaled to a user of the welding apparatus 10 that the apparatus is ready for a welding operation if the predetermined period has elapsed. This automatic flushing of the gas line is preferably always, in particular only, carried out when the welding apparatus 10 is switched on and/or after a relatively long stoppage time and/or after parts of the gas line 72 have been replaced.

The individual method steps in this case are controlled by the control device 99, which in particular also regulates the parameters of the welding operation, such as for example an electric voltage, a current intensity and a duration of the welding current, or a time and a speed of the stud movement, or a stud position, or a gas throughflow through the gas line 72. Furthermore, a filling level of the gas container 70 and the number of welds which have been made are detected, stored and output.

The invention has been described using examples of an apparatus for fastening a first object to a second object and also a production method for such an apparatus. The features of the embodiments described in this case may also be combined in any way whatsoever within a single fastening apparatus or a single production method. It is pointed out that the apparatus according to the invention and the method according to the invention are also suitable for other purposes.

The invention claimed is:

1. An apparatus for welding a weld stud to a substrate, the apparatus comprising a welding gun comprising a casing and a stud holder for the weld stud; a gas container; and a gas line for conducting gas from the gas container to the stud holder, wherein the gas container is supported by the welding gun and the gas line is supported by the welding gun, wherein the welding gun has a gas container receptacle for receiving the gas container.

2. The apparatus according to claim 1, wherein the gas line is arranged in the casing.

3. The apparatus according to claim 1, wherein the gas line has a gas connection element arranged on the gas container receptacle.

4. The apparatus according to claim 3, further comprising a gas throughflow regulation device for regulating a gas throughflow through the gas line.

5. The apparatus according to claim 1, further comprising a welding current supply; a first electric cable for conducting welding current from the welding current supply to the welding gun; and, a second electric cable for conducting the welding current from the substrate to the welding current supply.

6. The apparatus according to claim 5, further comprising a gas throughflow regulation device for regulating a gas throughflow through the gas line.

7. The apparatus according to claim 6, wherein the gas throughflow regulation device is arranged in the casing.

8. The apparatus according to claim 1, wherein the gas line is arranged entirely in the casing.

9. The apparatus according to claim 1, further comprising a gas throughflow regulation device for regulating a gas throughflow through the gas line.

10. An apparatus for welding a weld stud to a substrate, the apparatus comprising a welding gun comprising a casing and a stud holder for the weld stud; a gas container; and a gas line for conducting gas from the gas container to the stud holder, wherein the gas container is supported by the welding gun, further comprising a filling level detection device for the gas container, wherein the filling level detection device is supported by the welding gun.

11. The apparatus according to claim 10, wherein the filling level detection device comprises a pressure sensor for measuring internal pressure of the gas container.

12. The apparatus according to claim 11, further comprising a gas throughflow regulation device for regulating a gas throughflow through the gas line.

13. The apparatus according to claim 10, wherein the filling level detection device comprises a data processing device which detects a number of welds which have been made.

14. The apparatus according to claim 10, wherein the filling level detection device comprises a storage medium which is attached to the gas container, and a data processing device, which is supported by the gas gun and is suitable for storing information relating to a filling level of the gas container on the storage medium, or for reading the information out from memory of the filling level detection device.

15. The apparatus according to claim 10, wherein the filling level detection device comprises a display unit which displays a filling level of the gas container which is detected by the filling level detection device.

16. The apparatus according to claim 10, further comprising a gas throughflow regulation device for regulating a gas throughflow through the gas line.

17. The apparatus according to claim 10, wherein the welding gun has a gas container receptacle for receiving the gas container.

18. The apparatus according to claim 17, wherein the gas line has a gas connection element arranged on the gas container receptacle.

* * * * *